United States Patent
Pekar et al.

(10) Patent No.: US 7,536,041 B2
(45) Date of Patent: May 19, 2009

(54) 3D IMAGE SEGMENTATION

(75) Inventors: Vladimir Pekar, Hamburg (DE); Michael Reinhold Kaus, Hamburg (DE); Todd McNutt, Verona, WI (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 567 days.

(21) Appl. No.: 10/560,185

(22) PCT Filed: Jun. 9, 2004

(86) PCT No.: PCT/IB2004/050868

§ 371 (c)(1),
(2), (4) Date: Dec. 9, 2005

(87) PCT Pub. No.: WO2004/111937

PCT Pub. Date: Dec. 23, 2004

(65) Prior Publication Data

US 2006/0159341 A1 Jul. 20, 2006

(30) Foreign Application Priority Data

Jun. 13, 2003 (EP) .................................. 03101731

(51) Int. Cl.
*G06K 9/00* (2006.01)
*G06K 9/34* (2006.01)

(52) U.S. Cl. .................... 382/128; 382/164; 382/173

(58) Field of Classification Search .................. 382/128, 382/129, 130, 131, 132, 133, 134, 164, 171, 382/173, 179, 154, 177, 285; 600/407, 410, 600/411, 425, 443; 345/419, 423, 653, 654, 345/664, 665; 128/653.1, 920

See application file for complete search history.

(56) References Cited

U.S. PATENT DOCUMENTS 5,435,310 A * 7/1995 Sheehan et al. ............. 600/416
5,889,524 A 3/1999 Sheehan et al. ............. 345/419
6,106,466 A 8/2000 Sheehan et al. ............. 600/443

(Continued)

FOREIGN PATENT DOCUMENTS

WO WO 01/01864 A1 1/2001
WO WO 01/45562 A2 6/2001

OTHER PUBLICATIONS

Delingette, H.; Simplex Meshes: a General Representation for 3D Shape Reconstruction; 1994; IEEE; pp. 856-859.
McInerney, T., et al.; Deformable Models in Medical Image Analysis: a Survey; 1996; Medical Image Analysis; 1(2):91-108.
Pohle, R., et al.; Segmentation of 3-D medical image data sets with a combination of region Based initial segmentation; 2003; SPIE; 5032; pp. 1225-1231.

(Continued)

*Primary Examiner*—Abolfazl Tabatabai (57) ABSTRACT

A delineation of a structure of interest can be performed by fitting 3D deformable models, for example, represented by polygonal measures, to the boundaries of the structure of interest. The deformable model fitting process is guided by minimization of the sum of an external energy, based on image feature information, which attracts the mesh to the organ boundaries and an internal energy, which preserves the consistent shape of the mesh. A frequent problem is that the images do not contain sufficient reliable image feature information, such as image gradients, to attract the mesh. According to the present invention, manually drawn attractors in the form of complete or partial contours corresponding to boundaries of the structure of interest are placed into the images which do not contain sufficient feature information. These attractors may easily be discriminated by a subsequent segmentation process. Due to this, advantageously, a 3D deformable model can be fitted to structures of interest in images with poor contrast, noise or image artifacts.

11 Claims, 4 Drawing Sheets

U.S. PATENT DOCUMENTS

| | | | | |
|---|---|---|---|---|
| 6,385,332 B1 * | 5/2002 | Zahalka et al. | | 382/128 |
| 6,466,813 B1 | 10/2002 | Shukla et al. | | 600/411 |
| 6,985,612 B2 * | 1/2006 | Hahn | | 382/128 |
| 7,079,674 B2 * | 7/2006 | Paragios et al. | | 382/128 |
| 7,158,692 B2 * | 1/2007 | Chalana et al. | | 382/294 |
| 2003/0020714 A1 | 1/2003 | Kaus et al. | | 345/423 |

OTHER PUBLICATIONS

Weese, J., et al.; Shape Constrained Deformable Models for 3D Medical Image Segmentation; 2001; IPMI; LNCS 2082; pp. 380-387.

Zhukov, L., et al.; Dynamic Deformable Models for 3D MRI Heart Segmentation; 2002; Proc. Of SPIE; vol. 4684; pp. 1398-1405.

* cited by examiner

3D IMAGE SEGMENTATION

The present invention relates to the field of digital imaging and, more particularly, to the field of 3D image segmentation by the use of deformable models. In detail, the present invention relates to a method of segmenting a three-dimensional structure of interest, to an image processing device and to a computer program for an image processing unit.

Since the discovery of x-rays over one hundred years ago, radiation has been used increasingly in medicine, both to help with diagnosis (by taking pictures with x-rays), and as a treatment (radiotherapy). However, radiation obviously has to be used with care.

Radiotherapy, also called radiation therapy, is the treatment of cancer and other diseases with ionizing radiation. Ionizing radiation deposits energy that injures or destroys cells in the area being treated (the "structure, object or region of interest") by damaging their genetic material, making it impossible for these cells to continue to grow. Although radiation damages both cancer cells and normal cells, the latter are able to repair themselves and function properly. Radiotherapy may be used to treat localized solid tumors, such as cancers of the skin, tongue, larynx, brain, breast, or uterine cervix. It can also be used to treat leukemia and lymphoma (cancers of the blood-forming cells and lymphatic system, respectively).

One type of radiation therapy commonly used involves photons, "packets" of energy. X-rays were the first form of photon radiation to be used to treat cancer. Depending on the amount of energy they possess, the rays can be used to destroy cancer cells on the surface of or deeper in the body. The higher the energy of the x-ray beam, the deeper the x-rays can go into the target tissue. Linear accelerators and betatrons are machines that produce x-rays of increasingly greater energy. The use of machines to focus radiation (such as x-rays) on a cancer site is called external beam radiotherapy.

Gamma rays are another form of photons used in radiotherapy. Gamma rays are produced spontaneously as certain elements (such as radium, uranium, and cobalt 60) release radiation as they decompose, or decay. Each element decays at a specific rate and gives off energy in the form of gamma rays and other particles. X-rays and gamma rays have the same effect on cancer cells.

Another technique for delivering radiation to cancer cells is to place radioactive implants directly in a tumor or body cavity. This is called internal radiotherapy. (Brachytherapy, interstitial irradiation, and intracavitary irradiation are types of internal radiotherapy.) In this treatment, the radiation dose is concentrated in a small area, and the patient stays in the hospital for a few days. Internal radiotherapy is frequently used for cancers of the tongue, uterus, and cervix.

Several new approaches to radiation therapy are being evaluated to determine their effectiveness in treating cancer. One such technique is intraoperative irradiation, in which a large dose of external radiation is directed at the tumor and surrounding tissue during surgery.

Another approach is particle beam radiation therapy. This type of therapy differs from photon radiotherapy in that it involves the use of fast-moving subatomic particles to treat localized cancers. Some particles (neutrons, pions, and heavy ions) deposit more energy along the path they take through tissue than do x-rays or gamma rays, thus causing more damage to the cells they hit. This type of radiation is often referred to as high linear energy transfer (high LET) radiation.

Scientists also are looking for ways to increase the effectiveness of radiation therapy and to a minimise the radiation applied to the patient. For this, a radiotherapy planning may be perfomed using e.g. diagnostic data such as images to e.g. accurately identify a region, structure or object of interest and e.g. a tissue type surrounting this region.

Segmentation methods may be used to derive such structures of interest, such as, for example, organs or bones from volumetric image data (diagnostic images), such as CT, MR or US images. One popular segmentation approach is the use of deformable models. A survey about deformable models has been, for example, published by McInerney et al.: "Deformable models in medical image analysis: A survey", Medical Image Analysis, 1 (2): pp. 91-108, 1996. A deformable model can be represented as an elastic surface, the shape and position of which can change under the influence of an internal energy and an external energy. The internal energy serves to preserve as well as possible the shape of the model (which may have been formed on the basis of prior knowledge concerning the structure to be segmented). The external energy, however, should move the model surface in the direction of the object's edges. The external energy is derived from a three-dimensional image, that is from a dataset, which is a three-dimensional representation of the object containing the structure. Such a three-dimensional representation of the object usually consists of a plurality of two-dimensional images, each representing a slice of the object. The meshes are preferably shaped as triangles, the corner points of which are defined by three neighboring network points on the surface of the model.

According to the known method, structure points are searched on the surface of the structure to be segmented, i.e. along search lines, which may extend perpendicular to the triangular surfaces in the image. The surface of the structure to be segmented is usually characterized by a pronounced gradient of the image data. After the determination of such structure points for the meshes of the network defining the surface of the model, the network points of the model are calculated anew on the basis of the structure points found, i.e. the network points are calculated in such a manner that the weighted sum of the internal energy and the external energy assumes a minimum value for the newly found network points. According to this method, the position of the network points is influenced, not only by the directly neighboring structure points found during the search, but also by all other structure points. Subsequently, the method is repeated iteratively a number of times, by utilizing the newly calculated network points. Thus, the model is deformed upon each iteration, and the shape assumed by the model after the last iteration, i.e. after a shut-off criterion has been reached, is considered to be the structure to be segmented in the concrete object.

The three-dimensional image of the object may be generated, for example, during medical examinations, by means of the x-ray computed tomography method, the magnetic resonance method, or the ultrasonic method.

In other words, according to the above method, the deformable model fitting process is guided by minimization of the sum of the external energy, based on image feature information, which attracts the mesh to the boundaries of the structure of interest, and an internal energy, which preserves the consistent shape of the mesh.

A problem that may occur, for example, during the segmentation of the structure of interest using CT image data, is that the three-dimensional image often does not contain reliable feature information, for example, image gradients, to attract the mesh. In other words, it may occur that in some of the two-dimensional slices of the three-dimensional image, the surface of the structure of interest is not "visible" to the segmentation process, due to, for example, an insufficient gradient of the image data to attract the mesh. This may appear for several reasons: a poor discrimination of soft tissue, for example, in CT, a low image resolution or artifacts due to metal implants.

It is an object of the present invention to provide for an improved segmentation.

According to an exemplary embodiment of the present invention, the above object may be solved with a method of segmenting a three-dimensional structure of interest containing an object from a plurality of two-dimensional images. According to this exemplary embodiment of the present invention, images of the plurality of two-dimensional images with insufficient feature information for the structure of interest are identified. Then, attractors in the form of at least a partial contour of the structure of interest are manually drawn in the images of the plurality of two-dimensional images with insufficient feature information. Then, the structure of interest is segmented in the plurality of images by using, for example, the segmentation algorithm described above, with the manually drawn attractors replacing structure points in the areas of two-dimensional images where feature information is insufficient. Advantageously, according to an aspect of the present invention, this method may enable a more reliable fitting of 3D deformable models to structures, such as organ parts, where poor contrast, noise or image artifacts do not allow for a fully automatic boundary delineation. Furthermore, this may advantageously improve a robustness of the segmentation process.

Furthermore, in instances where, for example, from a hundred two-dimensional images forming the three-dimensional image, only, for example, twenty contain insufficient feature information for the structure of interest, according to the present invention the manual placement or drawing of the attractors has only to be performed in these twenty images and not in all hundred images. Thus, the interaction required from a user is minimized, which, in particular in clinical applications, is a critical concern.

According to another exemplary embodiment, the identification of two-dimensional images with insufficient feature information includes a segmentation process. In other words, according to the present invention, the segmentation process is applied to the three-dimensional image. Then, on the basis of the segmentation results from this first segmentation process, images of the two-dimensional images are identified containing insufficient feature information. Then, for these images with insufficient feature information, the manually drawn attractors are added. Then, a second segmentation process is performed, in which the attractors are included in the images previously identified as having insufficient feature information.

Advantageously, according to this exemplary embodiment of the present invention, the same segmentation process used for the final segmentation may be used for identification of the images containing insufficient feature information.

According to another exemplary embodiment, the segmentation of the structure of interest in the plurality of images is based on an iterative optimization of internal and external energy. Such structure segmentation based on an energy optimization is described in further detail by Weese et al.: "Shape constrained deformable models for 3D medical image segmentation", Proc. of 17$^{th}$ International Conference on Information Processing in Medical Imaging (IPMI), pages 380 to 387, Davies, Calif., USA, 2001, Springer-Verlag, which is hereby incorporated by reference.

Advantageously, the method according to this exemplary embodiment allows for a fast, efficient and very accurate segmentation process, which is also robust.

According to another exemplary embodiment, the segmentation for finally segmenting the structure of interest is also based on energy minimization, as, for example, described by Weese et al.: "Shape constrained deformable models for 3D medical image segmentation", Proc. of 17$^{th}$ International Conference on Information Processing in Medical Imaging (IPMI), pages 380 to 387, Davies, Calif., USA, 2001, Springer-Verlag, which is hereby incorporated by reference.

According to another exemplary embodiment, the manual drawing of attractors in the form of at least a partial contour of the structure of interest in the images of the plurality of two-dimensional images including insufficient feature information, involves an assignment of labels to voxels corresponding to the at least partial contour, such that the attractors are considered as strong edges of the structure of interest during segmentation. Thus, according to this exemplary embodiment of the present invention, the attractors are labeled such that they simulate a surface boundary of the structure of interest, i.e. a pronounced gradient in the image data. Thus, the method according to the present invention may, without further adaptation, be applied to a plurality of segmentation methods.

According to another exemplary embodiment, the method is for radiation therapy planning (RTP) on the basis of CT images. Advantageously, this exemplary embodiment of the present invention allows for an improved radiation therapy planning, due to the fast and accurate segmentation of the structure of interest.

According to another exemplary embodiment, an image processing device is provided, comprising a memory for storing the images, a pointer for drawing the attractors, and an image processor for segmenting the three-dimensional structure of interest in the images. According to an aspect of the present invention, attractors are manually drawn, which may correspond to at least a partial contour of the boundaries of the structure of interest in images with insufficient feature information. For this, the device may be adapted to prompt a user to make the respective input. Due to this, an improved segmentation is provided, even if there are images with insufficient feature information.

According to another exemplary embodiment, an image processing device is provided comprising an image processor which is further adapted to segment the structure of interest in the plurality of images and to identify the images of the plurality of 2-dimensional images with insufficient feature information for the structure of interest on the basis of at least one decision criterion.

Advantageously, due to, for example, the use of the decision criterion, a very fast, stable and robust process may be provided requiring only a reduced amount of operations, which allows to use a processor having a reduced performance. For example, by accordingly setting this decision criterion, the amount of operations required for segmentation may be reduced to an amount such that the image processing device may be implemented with a personal computer (PC) or workstation.

According to another exemplary embodiment, the image processor of the image processing device is adapted to perform a segmentation of the structure of interest with an iterative optimization of an internal and an external energy. This allows for a very accurate segmentation while keeping the required computational power low.

According to another exemplary embodiment, an image processing device is provided, comprising an image processor adapted to perform a segmentation of the structure of interest by using an energy minimization. This allows for an image processing device, which is fast, requires only reasonable computational performance and which results are highly robust.

According to another exemplary embodiment, an image processing device is provided comprising an image processor which is adapted such that the manual drawing of attractors in the form of at least a partial contour of the structure of interest in the images of the plurality of 2-dimensional images by means of the pointer causes the image processor to perform an assignment of labels to voxels corresponding to the at least partial contour such that the attractors are considered as strong edges of the structure of interest during segmentation. Thus, according to this exemplary embodiment of the present invention, the attractors are labeled such that they simulate a surface boundary of the structure of interest, i.e. a pronounced gradient in the image data Advantageously, this may allow for accurate segmentation, even in the case that insufficient image information is contained in portions of the image.

According to another exemplary embodiment, an image processing device is provided where the image processing device is a radiotherapy planning device, a radiotherapy device, a workstation, a computer or a personal computer. In other words, the image processing device may be implemented with a workstation, computer or a personal computer which are adapted accordingly. Also, the image processing device may be an integral part of a radiotherapy planning device, which is specially adapted, for example for an MD to perform a radiotherapy planning. For this, for example, the radiotherapy planning device may be adapted to acquire diagnosis data, such as CT images from a scanner. Also, the image processing device may be an integral part of a radiotherapy device. Such a radiotherapy device may comprise a source of radiation, which may be applied for both acquiring diagnostic data and applying radiation to the structure of interest.

Accordingly, according to exemplary embodiments of the present invention, processors or image processing devices which are adapted to perform the invention may integrated or part of radiation therapy (planning) devices such as e.g. disclosed in WO 01/45562 A2 and U.S. Pat. No. 6,466,813 which are both incorporated by reference.

According to another exemplary embodiment, a computer program is provided for an image processing unit, for segmenting a three-dimensional structure of interest from a plurality of two-dimensional images. The computer program may be written in any suitable programming language, for example, C++ and may, for example, be stored on a computer readable medium, such as a CD-ROM. Also, the computer program may be available from a network such as the World Wide Web, from which it may be downloaded to an image processing unit or suitable computer.

It may be seen as the gist of an exemplary embodiment of the present invention that images of the two-dimensional images forming a three-dimensional image of an object are identified, containing insufficient feature information for an automatic delineation or segmentation of the three-dimensional structure of interest in the object. Then, according to an aspect of the present invention, in these images, attractors are drawn, which may substantially follow at least a partial contour of the structure of interest. This may be done by an operator. The attractors are such that they can be easily discriminated by a feature search algorithm of a segmentation process, for example, through assignment of specific labels outside the typical intensity range of the image to voxels corresponding to the manually drawn contours. In the deformable model fitting process or segmentation process, the manually drawn contours may then be considered as artificial strong edges, which attract the model.

These and other aspects of the present invention will become apparent from and elucidated with reference to the embodiments described hereinafter.

Exemplary embodiments of the present invention will be described in the following, with reference to the following drawings.

Figure 1:
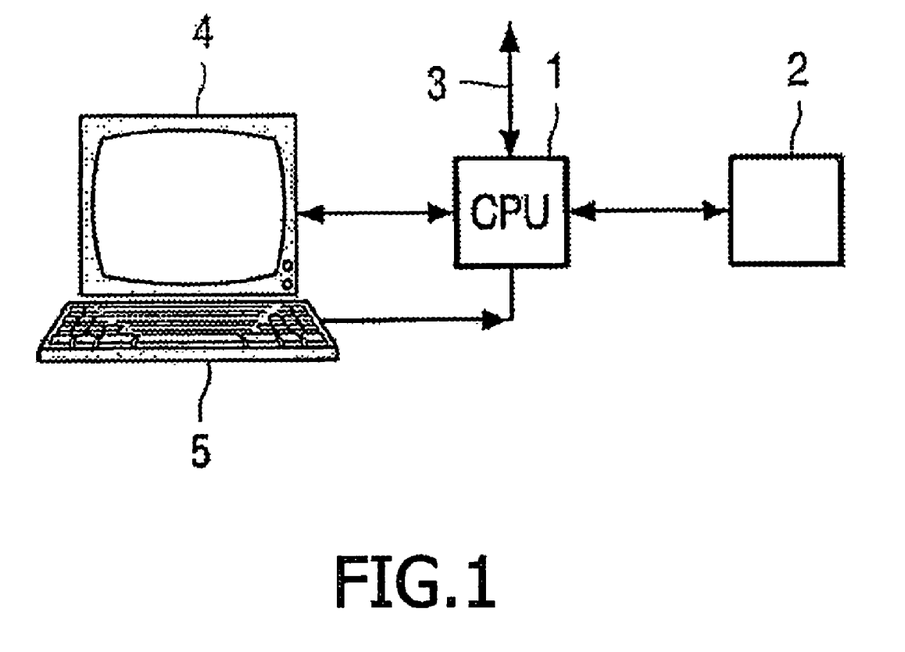
FIG. 1 shows a schematic representation of an image processing device according to an exemplary embodiment of the present invention, adapted to execute an exemplary embodiment of a method according to the present invention.

FIG. 1 shows an exemplary embodiment of an image processing device according to the present invention. The image processing device shown in FIG. 1 includes an image processing and control processor 1 with a memory 2 in which a deformable model of a structure to be segmented can be stored and which is capable of storing a plurality of two-dimensional images forming a three-dimensional image of an object to be examined. The image processing and control processor may be coupled, via bus system 3, to an imaging device (not shown in FIG. 1), for example, an MR apparatus, a US (ultrasonic) apparatus, or a CT apparatus. The structure segmented by the image processing and control processor can be displayed on a monitor 4. The user can access the image processing and control processor 1 via a keyboard 5 or other input means, which are not shown in FIG. 1, such as a mouse or a trackball. The keyboard 5, the mouse or the trackball are all considered as pointers, by which an operator may perform a pointing operation on an image displayed on the monitor 4 to, for example, draw attractors in the images displayed on the monitor 4.

According to exemplary embodiments of the present inventions, the image processing device may be a radiotherapy planning device, a radiotherapy device, a workstation, a computer or a personal computer. In other words, the above image processing device may be implemented by means of a computer, workstation, personal computer (PC) or the like. Also, the image processing device may be a radiotherapy planning device adapted to perform a radiotherapy planning. Such device may be connectable to a scanner device such as a CT scanner providing the diagnostic data.

Also, the image processing device may be a radiotherapy device comprising e.g. a source of radiation for generating ionized radiation. The radiotherapy device may either be for an internal or external radiation treatment. E.g. the radiotherapy device may be a high linear energy transfer (high LET) radiation type treatment device. Also, the radiotherapy device may apply gamma rays.

According to another exemplary embodiment, the image processing device may be integrated into a radiotherapy device including an x-ray source, such as e.g. a CT scanner. The x-ray source may be adapted for acquiring images of the structure of interest and to apply radiation to the structure of interest to perform the radiation therapy treatment.

Figure 2:
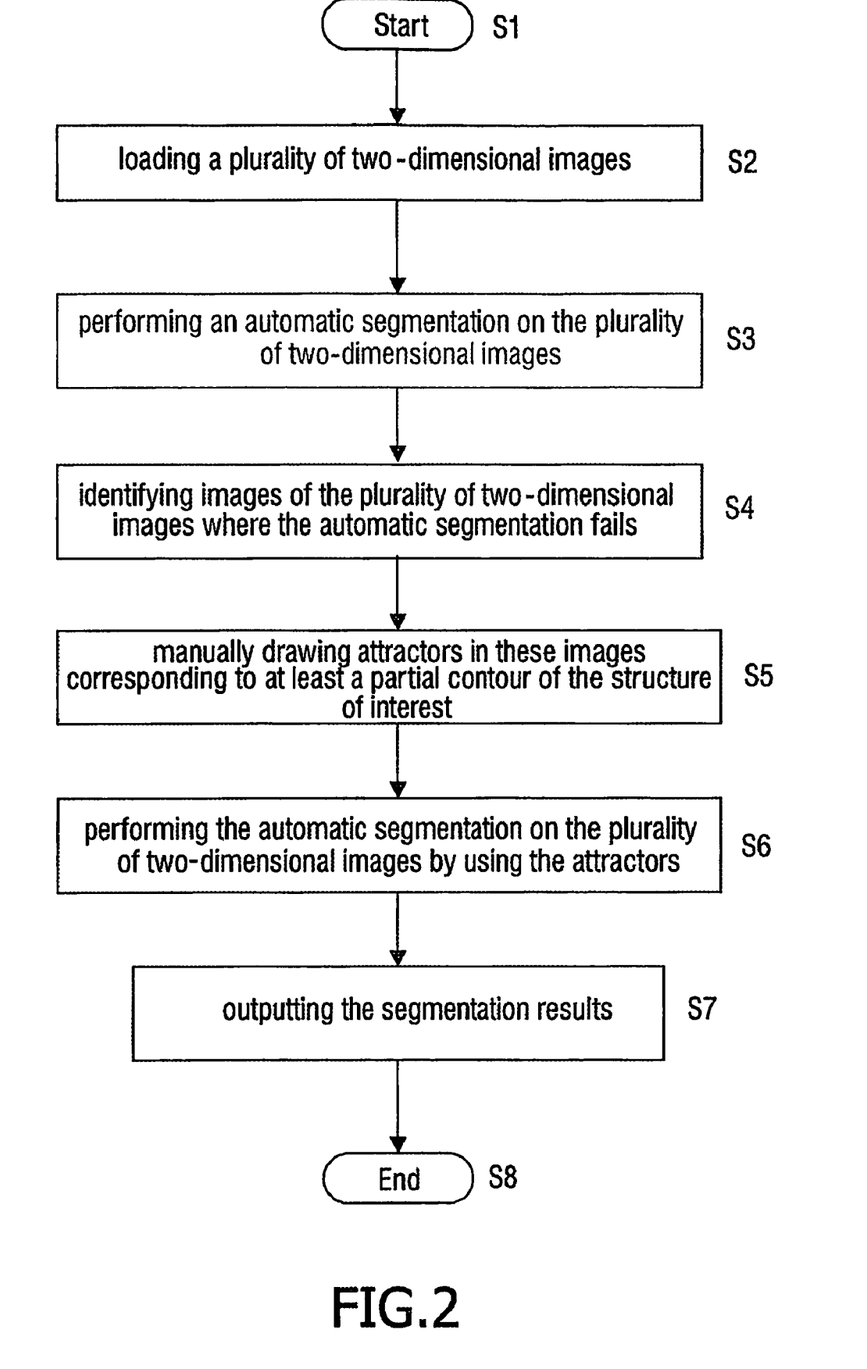
FIG. 2 shows a flowchart of an exemplary embodiment of a method according to the present invention.

FIG. 2 shows a simplified flowchart of a method or a computer program according an exemplary embodiment of the present invention for operating the image processing device depicted in FIG. 1. In the following example, CT images are used. However, it has to be noted that, as indicated above, the method of the present invention may also be applied to other suitable images. After the start in step S1, the method loads a plurality of two-dimensional CT images forming a three-dimensional image of an object from, for example, a CT scanner in step S2. Then, the method continues to step S3, where an automatic segmentation process is performed on the plurality of two-dimensional CT images in order to determine images of the plurality of two-dimensional images with insufficient feature information for the structure of interest. The segmentation process or deformable model fitting process is, as will be explained in further detail in the following, guided by minimization of the sum of an external energy, based on image feature information, i.e. a pronounced gradient designating a surface of the structure of interest, which attracts the mesh to the boundaries of the structure of interest and an internal energy, which preserves the consistent shape of the mesh. A problem in the segmentation process may occur if the two-dimensional images in the three-dimensional image do not contain reliable feature information, for example, image gradients, to attract the mesh. This may happen due, for example, to a poor discrimination of soft tissue, for example, in CT, to a low image resolution of the two-dimensional images, artifacts due to implants, such as, for example, metal implants or the like.

In the segmentation process performed in step S3, a deformable model M, for example, of the bladder, is adapted to the structure of interest. The surface of the model is formed by a network, the triangular meshes of which connect three neighboring network points on the surface of the model to one another three times.

Instead of a model thus subdivided into triangles, the surface of the model could also be defined by a polygonal structure, in which the meshes of the network do not have a triangular shape, but link a number of network points other than three to one another in the form of a polygon or a simplex.

The deformable model is usually represented by a mesh consisting of V vertices with coordinates $x_i$ and T triangles. To adapt the mesh to the structure of interest in the two-dimensional image, an iterative procedure is used, where each iteration consists of a surface detection step and a mesh reconfiguration step. Mesh reconfiguration is done by minimizing:

$$E = E_{ext} + \alpha E_{int} \quad (1)$$

The external energy $E_{ext}$ drives the mesh towards the surface patches obtained in the surface detection step. The internal energy $E_{int}$ restricts the flexibility of the mesh. The parameter α weights the relative influence of each term. The different components of the algorithm are now described in the following:

Surface Detection

For surface detection, a search is performed along a triangle normal $n_i$ to find a point $\tilde{x}_i$ with the optimal combination of feature value $F_i(\tilde{x}_i)$ and the distance δj to the triangle center $\hat{x}_i$:

$$\tilde{x}_i = \hat{x}_i + n_i \delta \, arg \, max\{F_i(\hat{x}_i + n_i \delta j) - D\delta^2 j^2\} j = -l, \ldots, l \quad (2)$$

The parameter l defines the search profile length, the parameter δ is the distance between two successive points, and the parameter D controls the weighting of the distance information and the feature value. For example, the quantity $$F_i(x) = \pm n_i^t g(x) \frac{g_{max}(g_{max} + \|g(x)\|)}{g_{max}^2 + \|g(x)\|^2} \quad (3)$$

may be used as a feature, where g(x) denotes the image gradient at point x. The sign is chosen in dependence on the brightness of the structure of interest, with respect to the surrounding structures. For image points with a gradient magnitude smaller than a threshold $g_{max}$, this quantity is essentially the gradient in the direction of the mesh normal.

During segmentation, this threshold prevents problems that occur, if the structure of interest has a considerably smaller gradient magnitude at the boundary than other objects in the neighborhood, or if different parts of the object of interest have boundaries with considerably different gradient magnitude.

External Energy

In analogy to iterative closest point algorithms, the external energy $$E_{ext} = \sum_{i=1}^{T} w_i (\tilde{x}_i - \hat{x}_i)^2, \quad w_i = \max\{0, F_i(\tilde{x}_i) - D(\tilde{x}_i - \hat{x}_i)^2\} \quad (4)$$

may be used, where the weights $w_i$ have been introduced to give the more promising surface points $\tilde{x}_i$ a larger influence during mesh reconfiguration. With this external energy, the detected surface points would directly attract the triangle centers of the mesh. As a consequence, once a triangle center has been attracted by a surface point in the image, it can hardly move anymore. For this reason, the mesh remains attached to false object boundaries, which are detected frequently at the beginning of the adaptation process. This problem is diminished considerably if the triangle centers $\hat{x}_i$ are attracted by the planes perpendicular to the image gradient at the surface point $\tilde{x}_i$:

$$E_{ext} = \sum_{i=1}^{T} w_i \left( \frac{g(\tilde{x}_i)}{\|g(\tilde{x})\|} (\tilde{x}_i - \hat{x}_i) \right)^2 \quad (5)$$

As may be gathered from the above equations, the external energy is based on a distance between the deformable model or shape model after adaptation and feature points, i.e. a boundary of the structure of interest.

Internal Energy

The starting point for the introduction of the internal energy is a shape model represented by a mesh of triangles with vertex coordinates $$m_i = m_i^0 + \sum_{k=1}^{M} p_k m_i^k; \quad i = 1, \ldots, V. \quad (6)$$

In this equation, $m_o^i$ denote the vertex coordinates of the mean model, $m_i^k$ describe the variation of the vertex coordinates associated with the M eigenmodes of the model, and $p_k$ represent the weights of the eigenmodes.

Since the shape model provides a suitable distribution of mesh vertices, the internal energy has been designed to maintain this distribution. For that purpose, the difference vectors between the coordinates of two neighboring mesh vertices are considered. Difference vectors for the deformable model and the shape model are compared, and the deviations between both are penalized:

$$E_{int} = \sum_{i=1}^{V} \sum_{j \in N(i)} \left( x_i - x_j - sR\left( m_i^0 - m_j^0 + \sum_{k=1}^{M} p_k(m_i^k - m_j^k) \right) \right)^2 \quad (7)$$

where the set N(i) contains the neighbors of vertex i. The scale s and the orientation R of the shape model, as well as its weights $p_k$, have to be determined in addition to the vertex coordinates $x_i$ during the mesh reconfiguration.

The segmentation process, i.e. the mesh reconfiguration is then performed by minimization of the total energy E as set forth in equation (1).

This method is described in further detail by Weese et al.: "Shape constained deformable models for 3D medical image segmentation", Proc. of $17^{th}$ International Conference on Information Processing in Medical Imaging (IPMI), pages 380 to 387, Davies, Calif., USA, 2001, Springer-Verlag, which is hereby incorporated by reference.

Then, in the subsequent step S4, images of the plurality of two-dimensional images, such as CT images, where the automatic segmentation failed, are identified. However, an image containing insufficient feature information may also be identified by an operator in a way that it is displayed to the operator on the monitor 4, who may then decide. In case the image does not contain sufficient feature information, i.e. the automatic segmentation in accordance with the method described with reference to step S3 fails, in step S5, attractors may be manually drawn by an operator in these images identified in step S4. For this, these images with insufficient feature information may be displayed to the operator who places the attractors by means of the pointer. Preferably, these attractors correspond to at least a partial contour of the structure of interest. As already mentioned, the manually drawn attractors may have the form of complete or partial contours corresponding to the boundaries of the structure of interest. These attractors are such that they can be easily discriminated by the feature search algorithm, which is part of the segmentation process performed in the subsequent step S6. This may be ensured, for example, through the assignment of specific labels outside the typical intensity range for the image data to the voxels corresponding to the manually drawn contours. In other words, by the manually drawn attractors, the boundaries or portions of the structure of interest may be characterized by an artificially pronounced gradient of the image data. Then, in the subsequent segmentation process or deformable model fitting process, the manually drawn contours or attractors may be considered as artificial strong edges, which attract the model in the absence of reliable image feature information.

For the manual drawing of attractors in these edges, these images may be individually displayed to the operator via the monitor 4.

In the subsequent step S6, an automatic segmentation process is performed on the plurality of two-dimensional images, such as CT images, by using the attractors. The method used as the automatic segmentation method, is preferably the same as described with reference to step S3. Thus, in order to avoid unnecessary repetition, reference is made to step S3 for the description of the segmentation process. In step S6, due to the fact that in the images with insufficient feature information with respect to the structure of interest, the attractors "simulate" an artificial strong edge, or a pronounced gradient, the segmentation is successful in all of the plurality of two-dimensional images, even in the images with insufficient feature information. Then, in the subsequent step S7, the segmentation results obtained in step S6 are output, for example, via the monitor 4 and then the method continues to step S8, where it ends.

Advantageously, the above described method allows to significantly reduce the amount of interaction required from an operator, since the attractors do not have to be added to all of the plurality of two-dimensional images, but only to those containing insufficient feature information, where the automatic segmentation fails. Furthermore, advantageously, the present invention allows to improve the robustness of automated organ delineation tools, for example, in RTP systems. Furthermore, in particular in radiation therapy planning, improvements can be achieved, since the segmentation results achieved with the present invention are highly accurate and allow for an accurate radiation therapy planning. Also, due to the semi-automatic interaction by the operator, a highly reliable setting of the deformable models to the structure of interest, such as organ parts, can be achieved, even where poor contrast noise or image artifacts do not allow a fully automatic boundary delineation.

Figure 3:
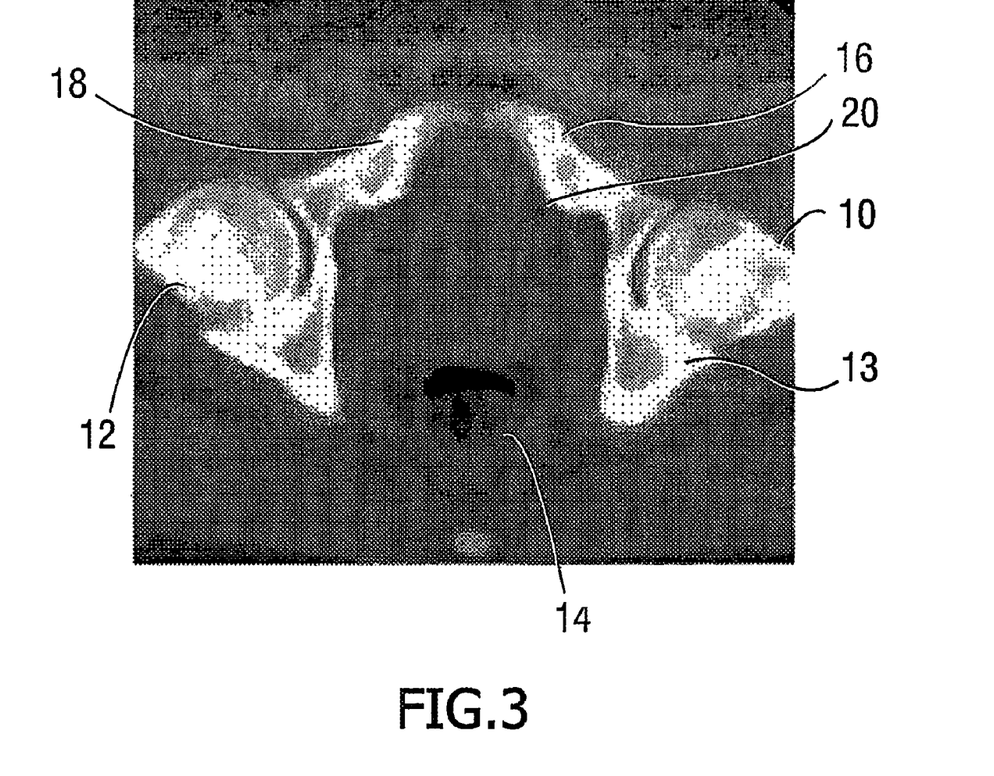
FIG. 3 shows a two-dimensional image of the 3D image, depicting the bladder.

FIG. 3 shows a two-dimensional CT image depicting the hip region of a male patient. Reference numerals 10 and 12 designate femur heads and reference numeral 13 designates the pelvis. Reference numeral 14 designates the spinal cord. Between two pelvis portions 16 and 18, the bladder 20 is located. As may be taken from FIG. 3, the bladder 20 is almost indistinguishable and there are no pronounced gradients in the image data of FIG. 3, clearly identifying boundaries of the bladder 20.

Figure 4:
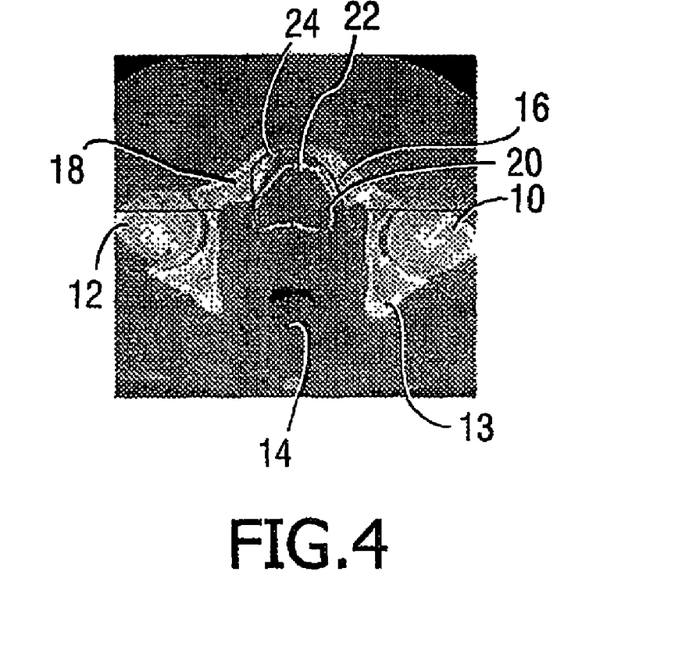
FIG. 4 shows the image of FIG. 3, where attractors have been added to the bladder in accordance with the present invention and the model is initialized.

FIG. 4 shows the image of FIG. 3, where the contour 22 of the bladder 20 was marked manually by, for example, an operator tracing the boundary or contour of the bladder 20 with a pointer device on the monitor 4, such that the voxels in the image of FIG. 4 are labeled accordingly. As may be taken from FIG. 4, the contour 22 is completely white, and thus represents a strong edge, which can easily be segmented by the segmentation process, since it strongly attracts the model. The starting model to be adapted to the contour 22 of the bladder 20 is indicated in FIG. 3 by reference numeral 24. As may be taken from FIG. 4, at the beginning of the segmentation process, the model 24 is not closely adapted to the contour 22 of the bladder 20.

Figure 5:
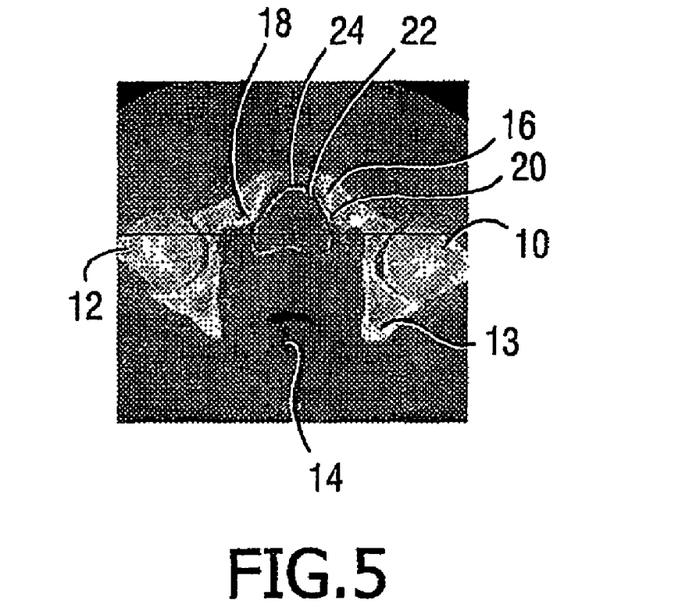
FIG. 5 shows the image of FIG. 4, where the model is adapted to the attractors in accordance with the present invention.

FIG. 5 shows the image of FIG. 4 at the end of the segmentation process, when the model 24 is closely matched to the contour 22.

Accordingly, as may be taken from a comparison of FIGS. 3 and 5, even in cases where the feature information included in the image is not sufficient to clearly distinguish boundaries of a structure of interest, such as the bladder 20, the present invention allows a highly accurate semi-automatic segmentation of such structure of interest.

The invention claimed is:

1. A method of segmenting a three-dimensional structure of interest which is contained in an object using a plurality of two-dimensional images, wherein each of the plurality of images represents a slice of the object, the method comprising the steps of:
   automatically determining which images of the plurality of two-dimensional images have insufficient feature information for the structure of interest, including the steps of:
      computer segmenting the structure of interest in each of the plurality of two-dimensional images to generate computer segmented two-dimensional contours;

computer identifying the two-dimensional images of the plurality of two-dimensional images with insufficient feature information for the structure of interest on the basis of at least one decision criterion;

manually drawing attractors in the form of at least a partial contour of the structure of interest in the two-dimensional images of the plurality of two-dimensional images with insufficient feature information; and with a computer, segmenting the structure of interest with a three-dimensional segmentation process using the attractors and the computer segmented contours of the plurality of two-dimensional images the three-dimensional segmenting including:

fitting a deformable model whose surface is formed by a network of meshes which interconnect network points on the surface of the deformable model to the structure of interest to the attractors and the computer segmented contours; and iteratively reconfiguring the deformable model based on an iterative optimization of an internal energy based on a distance between the deformable model after adaptation and the deformable model and an external energy based on a distance between the deformable model after adaptation and feature points on the structure of interest.

2. The method according to claim 1, wherein the manual drawing of attractors in the form of at least a partial contour of the structure of interest in the images of the plurality of two-dimensional images includes an assignment of labels to voxels corresponding to the at least partial contour such that the attractors are considered as strong edges of the structure of interest during segmentation.

3. The method according to claim 2, wherein the two-dimensional images include CT images.

4. An image processing device, comprising:
a memory for storing a plurality of two-dimensional images wherein each of the plurality of images represents a slice of an object;
a pointer for drawing attractors in the plurality of two-dimensional images; and
an image processor for segmenting a three-dimensional structure of interest which is contained in the object from the plurality of two-dimensional images, which image processor is adapted to perform the following operation:
determining images of the plurality of two-dimensional images with insufficient feature information for the structure of interest;
acquiring attractors manually indicated by a user, wherein the attractors have the form of at least a partial contour of the structure of interest in the images of the plurality of two-dimensional images; and
segmenting the structure of interest in the plurality of images by using the attractors.

5. The image processing device, according to claim 4, wherein the memory stores a two-dimensional image segmentation algorithm; and
wherein the image processor performs the steps of:
segmenting the structure of interest in the plurality of two-dimensional images using the two-dimensional image segmentation algorithm;
identifying the images of the plurality of two-dimensional images with insufficient feature information to segment the structure of interest on the basis of at least one decision criterion.

6. The image processing device according to claim 5, wherein the memory stores a three-dimensional segmentation algorithm; and
wherein the image processor is configured to perform the three-dimensional segmentation algorithm including;
fitting a deformable model whose surface is formed by a network of meshes which interconnect network points on the surface of the deformable model to the structure of interest to the attractors and contours of the structure of interest identified in the two-dimensional segmenting of the plurality of two-dimensional images; and
iteratively reconfiguring the deformable model on the basis of an iterative optimization of an internal energy based on a distance between the deformable model after adaptation and the deformable model and an external energy based on a distance between the deformable model after adaptation and feature points on the structure of interest.

7. The image processing device according to claim 6, further including:
a display device; and
wherein the image processor displays a manually movable cursor on the display for use by an operator in manual drawing the attractors in the form of at least a partial contour of the structure of interest on displayed images of the plurality of two-dimensional images to label voxels corresponding to the at least partial contour such that the attractors are considered as strong edges of the structure of interest by the three-dimensional segmentation algorithm.

8. The image processing device according to claim 4, wherein the image processor further performs the segmentation of the structure of interest in the plurality of two-dimensional images based on an adaptation of a three-dimensional deformable model whose surface is formed by a network of meshes which interconnect network points on the surface of the deformable model to the structure of interest; and
wherein the image processor is further performs the adaptation of the deformable model on the basis of an iterative optimization of an internal energy based on a distance between the deformable model after adaptation and the deformable model and an external energy based on a distance between the deformable model after adaptation and feature points on the structure of interest.

9. The image processing device according to claim 4, further including at least one of a radiotherapy planning device and a radiotherapy device.

10. A computer-readable medium with a computer program for an image processing unit for segmenting a three-dimensional structure of interest which is contained in an object from a plurality of two-dimensional images using a two-dimensional segmentation algorithm and a three-dimensional segmentation algorithm, wherein each of the plurality of images represents a slice of the object, which computer program controls the processing unit to perform the steps of:
segmenting the two-dimensional images using the two-dimensional segmentation algorithm to identify edge voxels of the structure of interest;
determining which images of the plurality of two-dimensional images have insufficient feature information to identify edge voxels of the structure of interest;
displaying a pointer by which a user manually indicates attractors wherein the attractors have the form of at least a partial contour of the structure of interest in the images of the plurality of two-dimensional images; and segmenting the structure of interest in the plurality of images with the three-dimensional segmentation algorithm using the attractors and the identified edge voxels.

11. A system for segmenting a three-dimensional structure of interest which is contained in an object from a plurality of two-dimensional images, wherein each of the plurality of images represents a slice of the object, the system comprising:

a memory which stores a two-dimensional segmentation algorithm, a three-dimensional segmentation algorithm, and a plurality of two-dimensional images, each of the plurality of two-dimensional images representing a slice of an object;

a display;

an image processor which performs the following operations:

separating the plurality of two-dimensional images into a first set of images that is automatically segmentable using the two-dimensional segmentation algorithm and a second set of two-dimensional images that are non-automatically segmentable using the two-dimensional segmentation algorithm due to insufficient boundary designation in a structure of interest in each image in the second set of images;

automatically segmenting the first set of images using the two-dimensional segmentation algorithm to designate boundaries of the structure of interest in the images of the first set of images;

causing the display of the second set of non-automatically segmentable two-dimensional images;

causing the display to display a pointer by which a user manually draws at least a partial contour to designate boundaries of the structure of interest in each image in the second set of non-automatically segmentable images, thereby forming a modified second set of two-dimensional images; and with the three-dimensional segmentation algorithm, automatically segmenting the structure of interest in three dimensions based on the boundaries designated in the first set of two-dimensional images and the modified second set of two-dimensional images.

* * * * *